United States Patent
De Maio

[15] 3,664,970
[45] May 23, 1972

[54] ETHYLENE OXIDE CATALYST
[72] Inventor: Dennis A. De Maio, Staten Island, N.Y.
[73] Assignee: Halcon International, Inc.
[22] Filed: Apr. 17, 1969
[21] Appl. No.: 817,169

Related U.S. Application Data

[63] Continuation-in-part of Ser. No. 723,915, Apr. 24, 1968, abandoned.

[52] U.S. Cl. .................................252/454, 252/476, 260/348.5
[51] Int. Cl. ...........................................................B01j 11/40
[58] Field of Search ..........................252/454, 455, 476; 260/348.5 F

[56] References Cited

UNITED STATES PATENTS

| | | | |
|---|---|---|---|
| 2,799,687 | 7/1957 | Gould et al. | 260/348.5 |
| 3,207,700 | 9/1965 | Saffer | 252/454 X |
| 3,258,433 | 6/1966 | Lambert et al. | 252/454 X |
| 3,420,784 | 1/1969 | Keith et al. | 252/454 |
| 3,501,417 | 3/1970 | De Maio | 252/454 |

Primary Examiner—C. F. Dees
Attorney—William C. Long and David Dick

[57] ABSTRACT

The invention is directed to improvements in the production of ethylene oxide by the controlled, partial oxidation of ethylene in the presence of a silver supported catalyst.

New results and advantages including elimination of the need for halogenated inhibitors in the ethylene oxide process are attributable to the use of a silver impregnated catalyst comprising inert porous support particles wherein at least 90 percent of the pore diameters fall within a limited range and the average pore diameter falls within a narrow range.

The invention is also attended by supplemental benefits in the form of increased productivity and/or reduced operating temperature.

4 Claims, No Drawings

ETHYLENE OXIDE CATALYST

This application is a continuation-in-part of application Ser. No. 723,915, filed Apr. 24, 1968 which is now abandoned.

This invention relates to the improved production of ethylene oxide and particularly to ethylene oxide catalysts and support material for such catalysts. More particularly, the invention concerns the use of inert, porous material having a limited range of pore diameters with a narrow average pore diameter range as support material for silver impregnated catalysts in the controlled, partial oxidation of ethylene to ethylene oxide. The invention also concerns an improved ethylene oxide process wherein said oxidation is effected in the presence of such catalysts and in the absence of halogenated inhibitors.

In general, commercial production of ethylene oxide is accomplished by the vapor phase reaction of ethylene with molecular oxygen in the presence of a silver catalyst. The silver is usually in finely divided metallic form distributed on or throughout an inert support or carrier material. The latter are indicated in the prior art as including such materials as clay, bauxite, bentonite, kieselguhr, active carbon pumice stone, silica and fused alumina. The manner of application of the silver to the support material and its effect on ethylene oxide productivity has been the subject of numerous investigations. In this regard, U.S. Pat. No. 3,172,893 discloses a method of application wherein silver is coated onto the surfaces of support particles by spraying with a slurry of precipitated silver oxide. British Pat. No. 754,593 discloses another method of silver application wherein silver is impregnated throughout the pores of the carrier by immersion of the latter in an aqueous silver solution, followed by drying and reduction to metallic silver.

Experience with the aforementioned silver catalysts has met with varying degrees of success, notwithstanding the close control of reaction conditions which the sensitive nature of the ethylene oxide process requires. Investigations have shown that results often vary depending on the method of silver deposition as well as the characteristics of the support material employed without a clear indication of the catalyst mechanism. The apparent complexity of such mechanism is compounded by the universal need for tempering the catalyst activity with a halogenated inhibitor, such as ethylene dichloride. The latter generally comprises a portion of the gaseous feed mixture to the reaction zone and, while incremental relative to the quantities of ethylene and oxygen consumed during production of ethylene oxide, nevertheless, is a cost factor.

The economic penalty attendant the employment of a halogenated inhibitor in the ethylene oxide process, however, is not measured by this cost factor alone. The metering of such inhibitor requires very careful control and regulatory apparatus together with the expense necessarily incurred by expanded technical personnel requirements account for a penalty significantly in excess of the cost of the inhibitor material alone. The presence of a halogenated inhibitor in the ethylene oxide process necessarily interferes with product purity requiring additional steps to effect removal or separation. Process control suffers to some extent since an additional variable is introduced to the system. Of prime importance, however, is the fact that the presence of a halogenated inhibitor necessitates the employment of mere expensive materials of construction to withstand the corrosive nature of the material. Additional disadvantages any be attributed to the use of halogenated inhibitors including the necessity of taking neutralization measures where high purity oxygen is employed to effect the partial oxidation of ethylene.

Accordingly, a principal object of the present invention is to provide a support material for catalysts used in the controlled, partial oxidation of ethylene to ethylene oxide which avoids the necessity of employing a halogenated inhibitor.

Another object of the invention is to provide a silver impregnated catalyst for use in the controlled oxidation of ethylene to ethylene oxide which obviates the need of a halogenated inhibitor.

A further object of the invention is to provide a catalyst for the controlled oxidation of ethylene to ethylene oxide which comprises a silver impregnated porous support permitting improved productivity and/or lower operating temperature.

Still another object of the invention is to provide an improved ethylene oxide process wherein controlled oxidation of ethylene to ethylene oxide is effected in the presence of the aforementioned inventive catalyst and in the absence of a halogenated inhibitor.

Other objects of the invention will in part be obvious in part appear hereinafter in the following detailed description and included embodiments.

The present invention is concerned essentially with a unique support material for silver-containing catalysts for use in the production of ethylene oxide. The invention stems from the discovery that use of a support material which is porous in nature and characterized by a limited range of pore diameters, the average pore diameter of which falls in a narrow range, can eliminate the heretofore universal need for halogenated inhibitors to temper or otherwise control the activity of the silver-containing catalysts employed in the controlled, partial oxidation of ethylene to ethylene oxide. The invention contemplates that ethylene oxide catalysts prepared with the unique support material will be of the "impregnated" type, that is, the catalyst is formed by filling the pores of the support material with a silver solution from which the silver solute is deposited. A discussion of an illustrative technique and procedure employed to prepare such a catalyst is provided in the aforementioned British Pat. No. 754,593.

The principles underlying the present invention are admittedly complex and the particular centers for catalyzing the different avenues of ethylene oxidation are not fully defined. Theoretically, some catalyst centers exhibit activity in the production of ethylene oxide from ethylene, while others exhibit activity in the formation of carbon dioxide from ethylene. It may also be conjectured that catalyst centers exist which effect the further oxidation of ethylene oxide to acid aldehydes and carbon dioxide. The picture is further complicated by the fact that realistic reaction rates and conversions attend high temperatures while low temperatures promote the selectivity of ethylene oxide. Normally, sufficiently high reaction temperatures are employed to provide an economically feasible ethylene conversion while a halogenated inhibitor, such as ethylene dichloride, is employed in the cycle gas to selectively poison those catalyst centers which exhibit undesirable activity, e.g., exhibit activity in the formation of carbon dioxide. While applicants do not intend to be bound thereby, in principle, it would appear that catalyst centers exhibiting undesirable activity are minimized by the more homogeneous distribution of silver obtained by deposition thereof upon a porous support material wherein a substantial portion of the pores have diameters which fall within a limited range and wherein the average pore diameter falls within a narrow range.

For the purpose of the invention a support material may be regarded as porous when it has a minimum apparent porosity of about 30 percent. It may be noted that apparent porosity may be determined by the mercury porosimeter method described by Drake and Ritter in "The Analytical Edition of Industrial Engineering Chemistry," Vol. 17, page 787 (1945).

A "substantial portion of the pores" may be regarded as embracing a minimum of about 90 percent of the total pores of the support material.

The invention contemplates a "limited range of pore diameters" as including a maximum pore diameter range of about 30 microns. Pore diameters may be determined by recourse to the B.E.T. nitrogen absorption method described by Brunauer, Emmett and Teller in "The Journal of the American Chemical Society," Vol. 60, page 309 (1938) and the Gurvicha equation described in "The Journal of the Russian Physical Chemical Society," Vol. 47, page 805 (1915).

The invention also contemplates that the "average pore diameter" will be of a size such that neither too low now too high a diffusion rate is encountered in practice. All other factors being equal, the former is attended by poor ethylene oxide selectivity while the latter is attended by poor catalyst activity. It has been determined that an average pore diameter range of 4 to 10 microns in combination with the aforementioned catalyst support characteristics permits a diffusion rate giving the optimum combination of ethylene oxide selectivity and catalyst activity without the necessity of employing a halogenated inhibitor.

Practice of the ethylene oxide process using the inventive catalyst and in the absence of a halogenated inhibitor may be conducted with a considerable degree of flexibility. Operation of the process may proceed at significantly reduced reaction temperatures while maintaining current productivity levels. Such operation might be dictated where maximum service life is a controlling factor. On the other hand, significantly increased productivity can be achieved without exceeding current operating temperatures.

In general, the inventive catalyst support may comprise any porous, inert material which does not detrimentally influence the catalytic reaction wherein it is employed. Accordingly, in the catalytic oxidation of ethylene to ethylene oxide, suitable support materials include alpha alumina, silicon carbide, fused aluminum oxide, mixtures of alumina and silica, and the like. Desirably, the support material comprises 90 percent or more by weight alpha alumina and 1 to 6 percent by weight silica. A preferred support material comprises 90 percent or more by weight alpha alumina, 1 to 6 percent by weight silica and 0.1 to 0.4 percent by weight baryta.

The form of the inventive support may be described as a pellet having linear and diametrical dimensions suitably within the range of one-eighth to five-sixteenths inch and may take almost any solid geometrical configuration. From the standpoint of simplicity, such configuration is suitably cylindrical, spheroidal or spherical. It is recognized that engineering factors, such as ability to pack uniformly, mechanical strength, pressure drop and stability, may influence the choice of configuration and, accordingly, it is contemplated that more complex configurations, such as saddles and rings, may be dictated.

The catalyst supports are prepared as follows: The support material, e.g., high-purity aluminum oxide particles, preferably in the alpha alumina phase, are thoroughly mixed with temporary and permanent binders. The temporary binders are thermally decomposable organic compounds of moderate to high molecular weight (i.e., molecular weights above about 250) and, on decomposition, produce the pore structure of the support. The permanent binders are inorganic clay-type materials having fusion temperatures below that of the alumina and are responsible for imparting mechanical strength to the finished support. Silica and baryta can also be added in quantity sufficient to obtain a finished support of the desired composition. After thorough dry-mixing, sufficient water is added to the mass to form the mass into a paste-like substance. The catalyst support particles are then formed from the paste by conventional means such as, for example, high pressure extrusion, granulation or other ceramic forming processes. The particles are then dried and are subsequently fired at an elevated temperature which is in the range of 1,200° to 1,600° C.

In the firing step, the temporary binders are thermally decomposed to carbon dioxide and water and are volatilized, leaving voids in the support mass. These voids are the genisis of the pore structure of the finished support. Suitable temporary binders include such materials as the celluloses and substituted celluloses, e.g., cellulose itself, methyl cellulose, ethyl cellulose, and carboxyethyl cellulose, stearates such as organic stearate esters, e.g. methyl or ethyl stearate, waxes and the like. As firing is continued, the temperature reaches the point at which the permanent binder (inorganic clay such as the kaolins or the ball clays) fuses. The catalyst support is then permitted to cool and, during cooling, the permanent binder sets and acts as a cement to bond the catalyst support particles and thereby impart mechanical strength to the support and ensure maintenance of the pore structure.

Catalyst supports of desired characteristics can be readily produced by the foregoing procedure. Control of pore size, pore size distribution and porosity are readily effected by appropriate adjustment in known manner of the size of the starting alumina particles, and of the particle size and concentration of the temporary and of the permanent binders in the starting mix. The larger the starting alumina particle size, the greater will be the porosity of the finished catalyst. The more homogeneous in size are the alumina particles, the more uniform will be the pore structure. Similarly, increasing the concentration of the temporary binder will also increase the overall porosity of the finished catalyst support.

As aforementioned, the support material of the present invention is intended for use in the preparation of ethylene oxide catalysts of the impregnated type rather than the coated type. Impregnation may suitably be accomplished by immersion of the support material in a silver solution, e.g., an aqueous solution of silver nitrate or silver lactate. Essentially, the solution with the support material immersed therein is heated, desirably to boiling, to effect degasification of the support materials and to insure complete and uniform impregnation thereof. The impregnated support material may then be removed for the excess solution, and carefully and slowly dried.

Deposited silver salt is then converted to a catalytically active form, e.g., by hydrogen reduction in a case such as silver nitrate or by thermal decomposition in a case such as silver lactate.

The amount of silver deposited upon the support material will be controlled by the concentration of the silver salt in the impregnating solution and by the porosity of the catalyst support. The actual amount of silver on the support after reduction or thermal decomposition can vary from about 5 percent to about 30 percent by weight of the reduced or thermally decomposed impregnated catalyst, the minimum value being dictated by insufficient activity while the maximum value represents the point where the catalyst begins to resemble a coated catalyst in physical properties.

Promoters are often employed in ethylene oxide catalysts in combination with silver catalytic material for the primary purpose of extending catalyst service life while also influencing particular aspects of the ethylene oxide reaction. In this regard, materials comprising barium, copper, mercury or tin are illustrative of promoters commonly employed in the catalystic oxidation of ethylene to produce ethylene oxide and contemplated by the present invention. Such materials are generally introduced to the silver catalytic material-containing media employed to impregnate the support and thus are generally co-deposited with the silver catalytic material.

In practice, a water-soluble salt of the promoting metal is added to the silver salt solution in such proportions that the concentration of promoter metal (based on the equivalent metal content of the oxide) is from about 0.1 percent to about 3.0 percent by weight of the silver metal content of the reduced catalyst. Amounts of promoter metal less than about 0.1 percent of the silver generally exert a negligible effect on catalyst life while amounts higher than about 3 percent lead to reactions which are difficult to control. The preferred concentration of promoter metal is from 0.1 to 1.5 percent by weight of the silver metal. The water-soluble salt of the promoter metal is from 0.1 to 1.5 percent by weight of the silver metal. The water-soluble salt of the promoter metal, of course, should be consonant with the technique employed to treat the deposited silver salt. Thus, in the case of reduction, the salt should be reducible to the oxide at the catalyst reduction temperatures employed. For this purpose, the nitrite and nitrate salts are suitable. In the case of thermal decomposition, the salt should be thermally decomposable at the thermal decomposition temperatures employed. For this purpose, the lactate and oxalate salts are suitable.

In the course of the investigation leading to the present invention, 3/16 inch spherical catalyst support pellets were prepared using the procedure set forth on page 6 and having the following chemical and physical properties:

TABLE I

| Chemical Composition | A | B | C | D |
|---|---|---|---|---|
| $Al_2O_3$ | 86.96 | 88.12 | 86.20 | 93.50 |
| $SiO_2$ | 11.65 | 9.79 | 12.40 | 5.30 |
| $Fe_2O_3$ | 0.30 | 0.20 | 0.24 | 0.18 |
| $TiO_2$ | 0.42 | 0.16 | 0.46 | 0.11 |
| CaO | 0.05 | 0.55 | 0.06 | 0.30 |
| MgO | 0.11 | 0.43 | 0.03 | 0.25 |
| $Na_2O$ | 0.32 | 0.19 | 0.34 | 0.07 |
| $K_2O$ | 0.17 | 0.07 | 0.20 | 0.04 |
| $ZrO_2+HfO_2$ | 0.02 | | 0.04 | |
| BaO | | 0.49 | | 0.27 |
| MnO | | | 0.01 | |

Physical Properties

| | A | B | C | D |
|---|---|---|---|---|
| apparent porosity, % | 51 | 56 | 40 | 53 |
| pore diameter range, / | 4–70 | 1–40 | 1–2 | 1–30 |
| average pore diameter, / | 19 | 7 | 1.8 | 5 |

The pellets were then impregnated with silver by immersion in a silver-containing solution prepared as follows: 1,000 parts by weight of silver oxide is added slowly with stirring to 1,224 parts by weight of an 85 percent solution of lactic acid in water over a period of 30 to 45 minutes, the mixture being continuously cooled to avoid temperatures in excess of 95° C. and thereafter 100 parts by weight of a 15 percent solution of hydrogen peroxide in water is slowly added to produce a clear yellow solution, whereupon 38 parts by weight of a 44.4 percent barium lactate solution in water is added. The silver-containing solution is maintained at a temperature of 90° to 95° C. during immmersion of the pellets, which are permitted to soak for 5 to 15 minutes with occasional stirring. The pellets are then separated from the solution by draining. After about 15 minutes of draining, the pellets are dried for at least 10 hours at a temperature of 60° to 70° C in an air atmosphere. The dried pellets are then heated gradually over a period of about 4 hours to a temperature of about 250° C. in an air atmosphere and maintained at such temperature for an additional 4 hours to effect activation.

Evaluation of the catalyst pellets, prepared as aforedescribed, was conducted at primary reactor conditions in a pressure reactor system for the controlled oxidation of ethylene to ethylene oxide. Feed gas comprising 5.0 percent ethylene, 6.0 percent oxygen, 0.1 percent ethane, balance essentially nitrogen, was passed at a flow rate of 53.5 lbs/hr/tube and a pressure of 315 psia through the prepared catalyst at a bed height of 24 ft 5 in. The results in terms of ethylene oxide selectivity and productivity obtained at recited reactor temperatures and halogenated inhibitor contents are set forth in Table II. It may be noted at this point that the term "selectivity" is commonly employed to indicate the percentage of converted ethylene constituting ethylene oxide, such value being of controlling importance in the operation of a primary or main reactor. The term "productivity" has a more general connotation but may be regarded simply as the difference between product output and product input across the reactor. In this regard, ethylene oxide productivity is commonly measured indirectly by $\Delta^{EO}$, i.e., the difference between the ethylene oxide concentration in the reactor effluent and inlet gases.

TABLE II

| | A | B | C | D | |
|---|---|---|---|---|---|
| Reactor temperature, °C. | 245 | 235 | 245 | 220 | 230 |
| Ethylene Dichloride, ppm | 0.03 | 0.04 | 0 | 0 | 0 |
| Selectivity | 70.5 | 68.3 | 70.8 | 74.9 | 70.4 |
| ΔEO | 1.16 | 0.03 | 0.96 | 1.32 | |

Analysis of the data of Table II indicates quite clearly that catalysts prepared with support D, i.e., the inventive support, permit the operation of the ethylene oxide process at significantly lower reaction temperatures, e.g., 220° to 230° C, without the necessity of employing a halogenated inhibitor. Comparison of inventive support D with support C, the only comparative support not requiring utilization of a halogenated inhibitor, reveals a most striking improvement in reaction temperature and productivity. Table II reveals that inventive support D may be employed at a reactor temperature 25° C lower than in the case of inventive support C with little reduction in productivity, and at a temperature of 15° C lower with a substantial increase in productivity.

Having determined the new results and advantages of the invention under primary reactor conditions, comparative data was sought at purge reactor conditions. Accordingly, feed gas comprising 1.4 percent ethylene, 6.0 percent oxygen, 7.0 percent carbon dioxide, 0.001 percent ethane balance essentially nitrogen, was passed at a flow rate of 37.5 lbs/hr/tube and a pressure of 315 psia through beds of catalysts prepared with support pellets A,B and D. No halogenated inhibitor was used. The results in terms of ethylene conversion and ethylene oxide productivity are given for different reactor temperatures in Table III. The term "conversion" is employed to indicate the percentage of ethylene which is converted, i.e., without regard to the products resulting from such conversion. As a purge reaction generally represents the last opportunity to wrest product from the raw materials, a high conversion value is of utmost importance.

TABLE III

| | A | | B | | D | |
|---|---|---|---|---|---|---|
| Temp., °C. | ΔEO | Conv.% | ΔEO | Conv.% | ΔEO | Conv.% |
| 235 | | | | 57.2 | 0.80 | 80.3 |
| 240 | | | | | 0.84 | 86.0 |
| 245 | 0.34 | 29.6 | 0.56 | 66.1 | | |
| 250 | | | | | | 88.0 |
| 255 | 0.48 | 45.0 | | | | |
| 265 | 0.56 | 55.7 | 0.64 | 73.5 | | |

Recourse to Table III reveals most dramatically that the catalyst prepared with support pellets D and illustrative of the invention permits the obtention of highest conversion and productivity values and at lowest reactor temperatures. It is apparent that significant economic advantages will attend practice of the invention since the data of Table III attests to a minimum ethylene recycle to the purge reactor as well as a maximum life of the catalyst employed therin.

While the invention has been described and disclosed in connection with various specific embodiments thereof, it is understood that no limitations or restrictions are intended thereby and that said embodiments are merely indicative of the best mode of practicing the invention, the embodiments thereof in which an exclusive property or privilege is claimed being defined as follows in the appended claims.

What is claimed is:

1. A catalyst for use in the controlled partial oxidation of ethylene to ethylene oxide, said catalyst comprising a catalyst support impregnated with silver, said catalyst support consisting essentially of inert, porous particles having a minimum apparent porosity of about 30 percent and wherein at least 90 percent of the pores have diameters in the range of 1 to 30 microns, the average of said diameters being in the range of 4 to 10 microns.

2. A catalyst according to claim 1 wherein said particles comprise silica0alumina.

3. A catalyst according to claim 2 wherein said silica is in the range of 1 to 6 percent by weight of said support particles.

4. A catalyst according to claim 2 wherein said particles comprise 0.1 to 0.4 percent by weight baryta.

* * * * *